United States Patent
Marfia et al.

(10) Patent No.: US 9,853,888 B2
(45) Date of Patent: Dec. 26, 2017

(54) METHOD AND ARRANGEMENTS FOR QOS-AWARE ROUTING IN A LI SYSTEM

(71) Applicant: TELEFONAKTIEBOLAGET LM ERICSSON (PUBL), Stockholm (SE)

(72) Inventors: Francesca Marfia, Bianco (IT); Paolo D'Amora, Gragnano (IT)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 100 days.

(21) Appl. No.: 14/903,792

(22) PCT Filed: Jul. 15, 2013

(86) PCT No.: PCT/SE2013/050907
§ 371 (c)(1),
(2) Date: Jan. 8, 2016

(87) PCT Pub. No.: WO2015/009209
PCT Pub. Date: Jan. 22, 2015

(65) Prior Publication Data
US 2016/0164775 A1 Jun. 9, 2016

(51) Int. Cl.
*H04L 12/725* (2013.01)
*H04L 29/06* (2006.01)
*H04L 29/08* (2006.01)

(52) U.S. Cl.
CPC ........... *H04L 45/302* (2013.01); *H04L 63/30* (2013.01); *H04L 63/306* (2013.01); *H04L 65/80* (2013.01); *H04L 67/322* (2013.01)

(58) Field of Classification Search
CPC ..... H04L 45/302; H04L 63/30; H04L 67/322; H04L 63/306; H04L 65/80
See application file for complete search history.

(56) References Cited

U.S. PATENT DOCUMENTS 7,535,900 B2 * 5/2009 Shenoi .............. H04L 29/06027
370/355
9,148,817 B1 * 9/2015 Nguyen ............ H04W 28/0268
(Continued)

FOREIGN PATENT DOCUMENTS

EP 2157804 A1 2/2010
WO 2013147654 A1 10/2013

OTHER PUBLICATIONS

Series G: Transmission Systems and Media, Digital Systems and Networks, Quality of service and performance, End-user multimedia QoS categories, ITU-T International Telecommunication Union—Telecommunication Standardization Sector of ITU, Recommendation G.1010, Nov. 2001.
(Continued)

*Primary Examiner* — Omar Ghowrwal (57) ABSTRACT

A method and arrangements providing QoS-aware routing of received session flows of separate communication sessions comprising Communication Content achieved and received from Lawful Interception of target sessions. The method comprises sorting each separate communication session into one of two groups, a first routing group and a second routing group, according to certain criteria wherein QoS is at least one of the criteria. Further, the method comprises routing communication sessions sorted into the first routing group via a regular handover interface and routing communication sessions sorted into the second routing group via an additional handover interface to a Law Enforcement Agency.

21 Claims, 8 Drawing Sheets

(56) References Cited

U.S. PATENT DOCUMENTS

| | | | | |
|---|---|---|---|---|
| 2004/0170186 | A1* | 9/2004 | Shao | H04L 47/10 370/412 |
| 2008/0026754 | A1* | 1/2008 | Chang | H04W 36/10 455/436 |
| 2009/0207751 | A1* | 8/2009 | Attanasio | H04M 3/2281 370/252 |
| 2010/0039946 | A1* | 2/2010 | Imbimbo | H04L 65/1006 370/252 |
| 2010/0135215 | A1* | 6/2010 | Tang | H04L 5/0044 370/328 |
| 2010/0142389 | A1* | 6/2010 | Imbimbo | H04L 65/80 370/252 |
| 2010/0150138 | A1* | 6/2010 | Bjorsell | H04L 63/00 370/352 |
| 2011/0235543 | A1 | 9/2011 | Seetharaman et al. | |
| 2011/0244916 | A1* | 10/2011 | Attanasio | H04M 3/2281 455/525 |
| 2012/0069971 | A1* | 3/2012 | Jayaraman | H04M 3/2281 379/35 |
| 2013/0088961 | A1* | 4/2013 | Ramachandran | H04L 47/125 370/235 |
| 2014/0056317 | A1* | 2/2014 | Sanders | H04J 3/1629 370/474 |
| 2014/0328348 | A1* | 11/2014 | de Santis | H04L 69/22 370/392 |
| 2015/0049613 | A1* | 2/2015 | D'Amora | H04L 47/11 370/235 |
| 2015/0281025 | A1* | 10/2015 | Wallbaum | H04L 43/0829 370/252 |
| 2015/0341392 | A1* | 11/2015 | Marfia | H04L 63/306 370/259 |
| 2017/0104868 | A1* | 4/2017 | Bjorsell | H04M 3/2281 |

OTHER PUBLICATIONS

Final draft ETSI ES 201 671 V3.1.1 Lawful Interception (LI); Handover interface for the lawful interception of telecommunications traffic, Oct. 2006.

ETSI TS 102 232-1 V3.4.1proposed Lawful Interception (LI); Handover Interface and Service-Specific Details (SSD) for IP delivery; Part 1: Handover specification for IP delivery, Jun. 2011.

3GPP TS 33.106 "Lawful Interception requirements (Release 8)".

3GPP TS 33.107 "Lawful interception architecture and functions (Release 8)".

3GPP TS 33.108 "Handover interface for Lawful Interception" (Release 8).

* cited by examiner

METHOD AND ARRANGEMENTS FOR QOS-AWARE ROUTING IN A LI SYSTEM

This application is a 371 of International Application No. PCT/EP2013/050907, filed Jul. 15, 2013, the disclosure of which is fully incorporated herein by reference.

TECHNICAL FIELD

The present disclosure is related to Lawful Interception. More particularly, the disclosure presents a method and an arrangement for providing QoS-aware routing of received session flows of separate communication sessions.

BACKGROUND

The network operators experience a continuously growing trend of data traffic in their mobile networks due to increasing number of subscribers and the growing number of subscriber services, e.g. video traffic, audio traffic, social networking applications, interactive games etc. Said subscriber services and applications require more bandwidth capacity. Of several reasons, there is a continues growing demand for more network bandwidth. The growth in subscriber mobile data traffic forces mobile network operators to increase their network capacity increasing the cost per bit transmitted in order to avoid congestion problem that affect the quality of different services, e.g. multimedia or data transfer services.

Said growth in subscriber mobile data traffic has also an impact on Lawful Interception (LI) services. From an LI scenario, there is no a solid policy strategy that maintains network performance and maximize user experience even though the demand for more capacity increase. During data traffic peaks the bandwidth is limited and this situation put the network under heavy load and create network congestion. When a Law Enforcement Agency (LEA) is interested in receiving the service data of a target subscriber, the LI system should be able to decode and send Content of Communication (CC), which may be as high as Gbps of information. If CC delivered to LEA is affected by a poor quality and doesn't meet Quality of Service (QoS) requirements in terms of information loss or IP packet delay variation, the CC may not be useful for interception purposes.

An LI system and network comprises an HI3 interface for delivering CC to a LEA. Sending over HI3 interface CC affected by a significant degradation leads to five main problems:
1. Waste of bandwidth for the Network Operator because bandwidth is also used for delivering, over the HI3 interface, CC not useful for interception purposes;
2. Waste of time for the LEA's operator who has to deal with corrupted intercepted CC;
3. Multimedia services degradation introduced by functions in the LI system. The quality of these services, that are more sensitive to latency and jitter, is impacted since the delivered CC may not be useful for interception purposes;
4. Multimedia services affected by jitter cannot be used by the LEA as soon as packets are received. Before starting the play of the multimedia service, the LEA must compensate for any jitter that it detects;

Thus, there are problems to keep or even improve QoS in LI systems due to the growing demand for more bandwidth of different services and applications.

SUMMARY

The purpose of the following disclosure is to provide QoS support in routing of LI data, i.e. content of communication with the aim to improve the possibility to guarantee the quality of experience (QoE) perceived by LEA's operator about the services delivered on a HI3 interface and effective resource usage.

Said purpose is achieved by means of a technical solution, which different aspects will be further described hereafter.

According to a first aspect, a method and embodiments thereof are disclosed. Said method is a method for "Quality of Service"-aware routing of received session flows of separate communication sessions comprising Communication Content achieved and received from Lawful Interception of target sessions. The method comprises sorting each separate communication session into one of two groups, a first routing group and a second routing group, according to certain criteria wherein QoS is at least one of the criteria. Further, the method comprises routing communication sessions sorted into the first routing group via a regular handover interface and routing communication sessions sorted into the second routing group via an additional handover interface to a Law Enforcement Agency.

According to a second aspect, an arrangement and embodiments of said arrangement are provided. Said arrangement is adapted for "Quality of Service"-aware routing of received session flows of separate communication sessions comprising Communication Content achieved and received from Lawful Interception of target sessions. The arrangement comprises a sorting device configured to sort each separate communication session into one of two groups, a first routing group and a second routing group, according to certain criteria wherein QoS is at least one of the criteria. Said arrangement further comprises a routing circuitry configured to route communication sessions sorted into the first routing group via a regular handover interface and route communication sessions sorted into the second routing group via an additional handover interface to a Law Enforcement Agency.

According to further one aspect, an arrangement and embodiments of said arrangement are provided. Said arrangement is an arrangement for "Quality of Service"-aware routing of received session flows of separate communication sessions comprising Communication Content achieved and received from Lawful Interception of target sessions. The arrangement comprises a processor and a memory, said memory containing instructions executable by said processor whereby said arrangement is operative to sort each separate communication session into one of two groups, a first routing group and a second routing group, according to certain criteria wherein QoS is at least one of the criteria. Said arrangement is further operative to route communication sessions sorted into the first routing group via a regular handover interface HI3 and routing communication sessions sorted into the second routing group via an additional handover interface to a Law Enforcement Agency.

One advantage of the different aspects is that they provide QoS support in routing of LI data, i.e. content of communication with the aim to guarantee the quality of experience (QoE) perceived by LEA's operator about the services delivered on a HI3 interface and effective resource usage.

BRIEF DESCRIPTION OF THE DRAWINGS

The foregoing, and other, objects, features and advantages of the present invention will be more readily understood upon reading the following detailed description in conjunction with the drawings in which.

DETAILED DESCRIPTION

In the following description, for purposes of explanation and not limitation, specific details are set forth, such as particular circuits, circuit components, techniques, etc. in order to provide a thorough understanding of the present invention. However, it will be apparent to one skilled in the art that the present invention may be practiced in other embodiments that depart from these specific details. In other instances, detailed descriptions of well-known methods, devices, and circuits are omitted so as not to obscure the description of the present invention with unnecessary detail.

Figure 1:
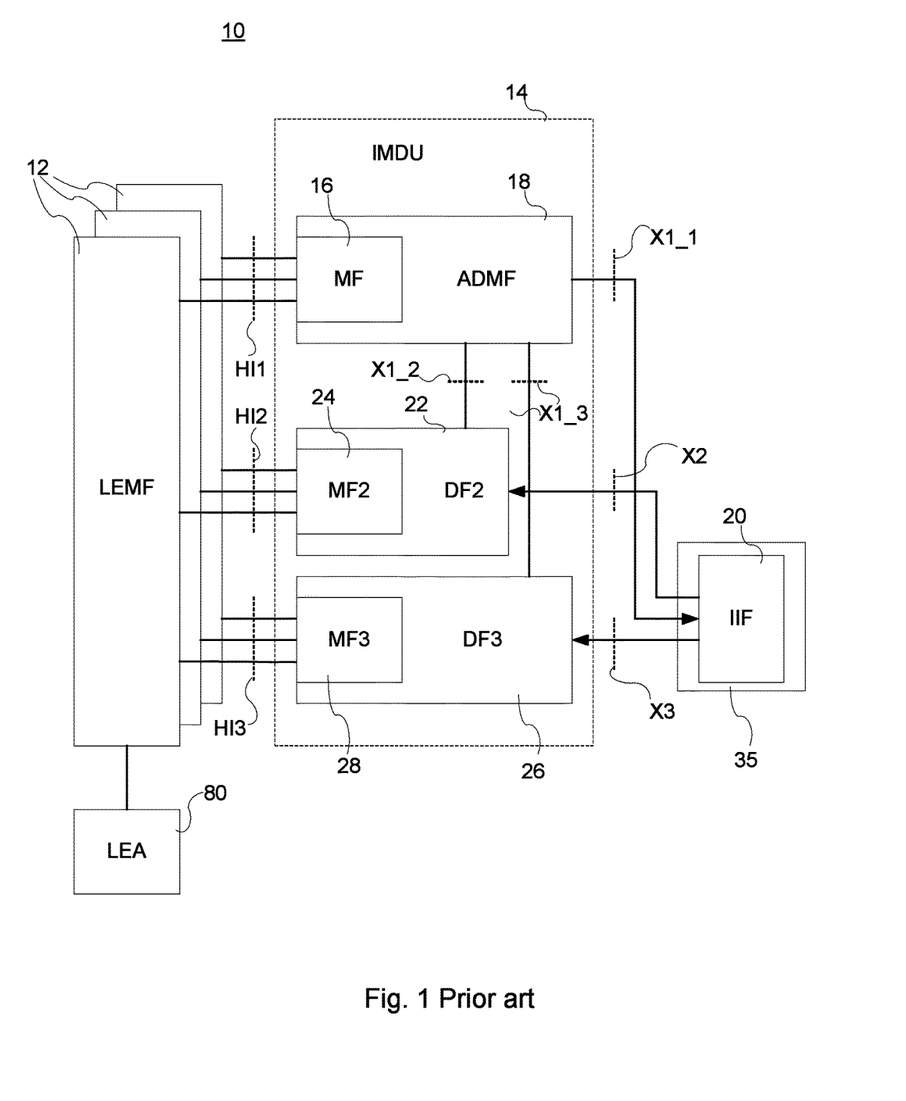
FIG. 1 is a block diagram of an exemplary Lawful Interception (LI) system and network 10 according to prior art.

FIG. 1 is a block diagram of an exemplary Lawful Interception (LI) system and network 10 according to prior art. Said system and network comprises a number of entities. The exemplary LI system comprises a Law Enforcement Management Function, LEMF, 12 for requesting LI services of the LI system and collecting the intercepted information of an Internal Interception Function, IIF, 20 connected to a Network Internal Function 35. The system shall provide access to the intercepted Content of Communications, CC, and Intercept Related Information, IRI, of a target and services related to the target on behalf of one or more Law Enforcement Agencies, LEAs 80. An intercept request, also denoted Request for LI activation, is sent through a first Handover Interface, HI1, located between the Law Enforcement Management Function 12 and an Intercept Mediation and Delivery Unit, IMDU, 14 comprising a Mediation Function, MF, 16 and an Administration Function, ADMF, 18. Said Mediation Function 16 and Administration Function 18 generates based on said received request a warrant comprising said one or more target identities, and sends said warrant towards an IIF, 20, via an interface denoted X1_1. The IIF 20 is connected to a Network Internal Function 35, e.g. a node of a network, the Internet, a 3 GMS (third generation Mobile Communications System), etc., from which it intercepts said Content of Communications and Intercept Related Information of a mobile target. Said CC and IRI are network related data. As reference to the standard model, see references [1], [2] and [3], the content of communication is intercepted by the IIF in the network node and it is based upon duplication of target communication payload without modification. In reference [3], the interfaces HI1 and HI2 is specified in more detail. The IIF sends IRI raw data via an interface X2 to a Delivery Function for IRI reporting, DF2, 24 and a Mediation Function of IRI, MF2, 22 that generates and delivers to a collection functionality a standardized IRI report based on the received IRI report. Said standardized IRI report is sent over a standardized interface HI2 to the LEMF 12. The IIF 20 also sends CC raw data via an interface X3 to a Delivery Function for CC reporting, DF3, 26 and a Mediation Function of IRI, MF3, 28 which generates and delivers to a collection functionality a standardized CC report based on the received CC report. Said standardized CC report is sent over a standardized interface HI3 to the requesting LEMF 12.

Figure 2:
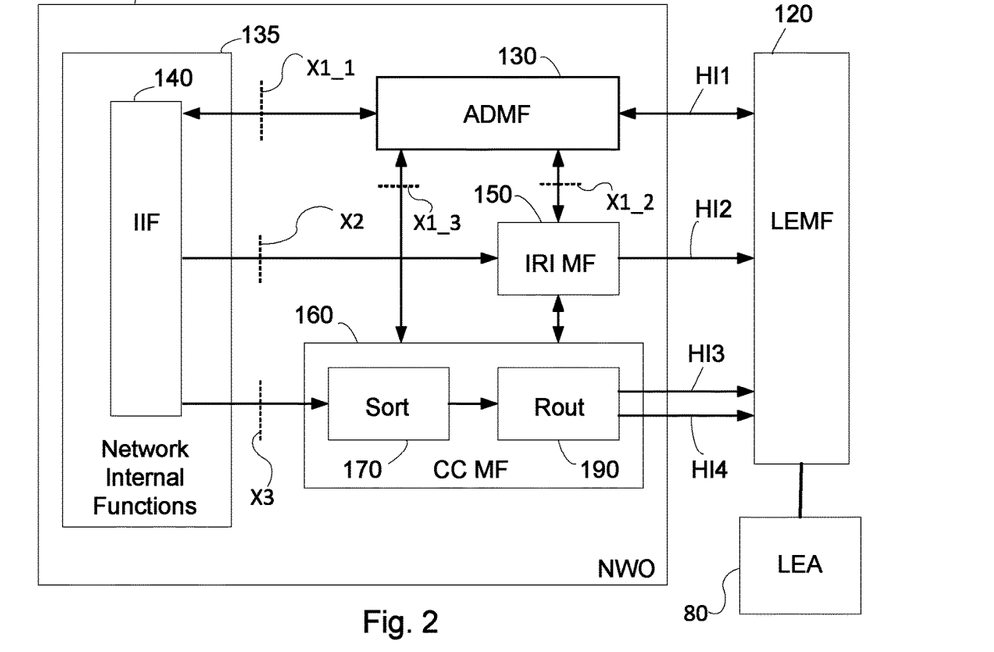
FIG. 2 is a block diagram illustrating an exemplary Lawful Interception system and network comprising the arrangement for QoS-aware routing.

FIG. 2 illustrates an exemplary Lawful Interception (LI) system and network 100 comprising the arrangement 160 for QoS-aware routing of received session flows of separate communication sessions.

The LI system and network 100 comprises at least a LEMF 120 and a LEA 80. Said LEMF communicates with an ADMF 130 over HI1, the IRI MF 150 over HI2 and the CC MF 160 over HI3 and an additional interface HI4.

The ADMF 130 in the embodiment in FIG. 2 corresponds to the ADMF 18 and MF 16 in FIG. 1. The IRI MF 150 in the embodiment in FIG. 2 corresponds to the Delivery Function for IRI reporting, DF2, 24 and a Mediation Function of IRI, MF2, 22 in FIG. 1. The IIF 140 is located in a Network Internal Functions 135 for generating session flows of separate communication sessions of different targets, said communication sessions passing the IIF 140.

The IIF sends IRI raw data via an interface X2 to a IRI MF 150 that generates and delivers to a collection functionality a standardized IRI report based on the received IRI report. Said standardized IRI report is sent over a standardized interface HI2 to the LEMF 120. The IIF 20 also sends CC raw data via an interface X3 to a CC MF 160 which generates and delivers a standardized CC report based on the received CC report. Said standardized CC report is sent over a standardized interface HI3 to the requesting LEMF 120.

According to one first aspect, the CC MF 160 is an arrangement 160 for QoS-aware routing of received session flows of separate communication sessions comprising Communication Content achieved and received from Lawful Interception of target sessions. The arrangement 160 comprises a sorting device 170 configured to sort each separate communication session into one of two groups: a first routing group and a second routing group. The grouping based on to certain criteria wherein QoS is at least one of the criteria, and a routing circuitry 190 configured to route communication sessions sorted into the first routing group via a regular handover interface HI3 and route communication sessions sorted into the second routing group via an additional handover interface HI4 to a Law Enforcement Agency 80 via an LEMF 120.

The new provided interface HI4 has the same feature and characteristics as the standard HI3. Said feature and characteristics are defined for HI3 in reference [5]. The difference between HI3 and HI4 is that HI4 is dedicated for transport of low quality CC. It is a handover interface which will be used, e.g. if the LEA is requesting the service of an extra HI3 for transferring low quality marked CC as proposed in this disclosure.

Figure 3:
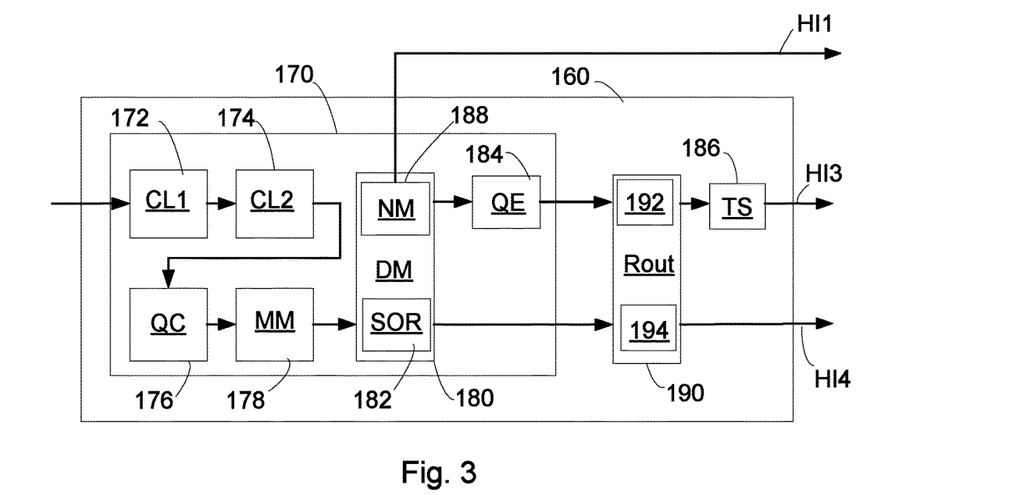
FIG. 3 is a block diagram showing further one embodiment of the arrangement, i.e. a CC MF, in more detail.

FIG. 3 shows further one embodiment of the arrangement 160, i.e. a CC MF, in more detail.

The CC MF comprises a sorting device 170 and a routing circuitry 190.

The sorting device 170 comprises a first classifier 172 configured to classify the received session flows into separate communication sessions, and a second classifier 174 configured to classify each communication session into one of two traffic classes, a first traffic class and a second traffic class.

The level 1 classification is performed by the first classifier 172 and said classification gives the possibility to classify the incoming streams of packets into distinct communication sessions. A communication session is identified by the following tuple: protocol, destination protocol port, source protocol port, destination host address, and source host address.

The level 2 classification is performed by the second classifier 174 and it provides the algorithm with the means to determine and classify communication sessions into different traffic classes, which enables differentiated traffic handling.

According to one embodiment, the first traffic class comprises communication sessions belonging to multimedia services and the second traffic class comprises communication sessions of other data transfer services than multimedia services. However, other traffic class distinctions are possible enabling other embodiments of classification circuitry or modules. For example, different kinds of multimedia services, e.g. VoIP (Voice-over-IP), IPTV (Internet Protocol Television), may be classified into different traffic classes. According to other embodiments, more than two traffic classes are used.

The sorting device 170 further comprises quality checking circuitry 176 configured to check QoS of each communication session in relation to a pre-determined key parameter and a pre-set threshold value of said key parameter in a threshold test.

The Quality Checker block 176 is responsible for checking the quality level of the stream of packets through pre-determined key parameter, e.g. routing metrics. A routing metric is a quality requirement used by the routing algorithm to determine the best route to be chosen.

According to some embodiments, the predetermined key parameters when checking of QoS may be information loss for communication sessions of the first traffic class and delay variation for communication sessions of the second traffic class.

During the transmission along the path that carries packets from the Interception Access Point (IAP), where the target's communication session is intercepted, to the DF3 block, information loss in the CC data may occur. Information loss is a general term for IP packets loss or IP packets corruption, and it refers to the effects of IP packets corruption or IP packet loss during transmission, but also includes the effects of any degradation introduced by media coding for more efficient transmission, e.g. the use of low bit-rate speech codecs for voice. This metric applies especially to "Data transfer" traffic wherein information loss is sensitive.

Delay Variation may be introduced during the transmission along the path that carries packets from the IAP to the DF3. It is generally included as a performance parameter and it is defined as the variation in the delay of received packets, also known as jitter. This may occur in case of network congestion, improper queuing, or configuration errors, and instead of remaining constant, the delay between packets can vary. This metric is especially applied to "Multimedia" traffic streams that are time-sensitive.

QoE is a measure of the overall level of end-user satisfaction with a service and is also defined as the QoS finally perceived by end-user. Thus, a low QoS is perceived by LEA's operator as a low QoE. For example: if a multimedia service is affected by an high jitter, which means low QoS, then LEA's operator may experience moments of silence, which means low QoE.

A threshold mechanism is proposed for verifying the compliance of service streams to the above listed routing metrics. IP packets belonging to the services that exceed these thresholds and so that affect the LEA's QoE are marked as LQoE, Low Quality of Experience, and others are marked as HQoE, High Quality of Experience. The sorting device 170 is therefore provided with marking circuitry 178 configured to mark each communication session as high quality or low quality in accordance with the outcome of the threshold test.

At the egress of the marking circuitry 178, the packets marked as LQoE or HQoE are treated in a different way by means of a decision making circuitry 180.

The sorting device 170 further comprises a decision making circuitry 180. The decision making circuitry 180 is configured to sort each separate communication session into one of two groups: a first routing group and a second routing group. The grouping is based on certain criteria wherein QoS is at least one of the criteria. Thus, the decision making circuitry 180 is configured to sort the communication sessions according to their marking.

The decision making block 180 handles communication sessions being marked as HQoE or LQoE. The decision making block 180 reads the quality marking of the communication session, and it decides based on the quality marking and traffic class if a communication session should be treated enhance the quality or routed directly over HI3 or HI4. It may also be configured to instruct the routing circuitry 190 whether to rout a communication session over HI3 or HI4 based on the quality marking and traffic class.

According to one example, communication sessions marked as low quality of the second traffic class are sorted into the second routing group and the other communication sessions are sorted into the first routing group regardless of quality marking and traffic classes.

The first routing group may comprise low quality communication sessions of the first traffic class, e.g. LQoE multimedia streams, as such sessions are directed to a Quality Enhancer block to be de-jittered before forwarded via the HI3 interface. The other communication sessions marked HQoE e.g. HQoE multimedia streams and HQoE data transfer streams, are sorted into the first routing group which simply are mediated over HI3.

Low quality communication sessions of the second traffic class, e.g. LQoE data transfer streams, that enter the Decision making circuitry block 170 are delivered over HI4.

As already stated herein, the arrangement 160 further comprises a routing circuitry 190 configured to route communication sessions sorted into the first routing group via a regular handover interface HI3 and route communication sessions sorted into the second routing group via an additional handover interface HI4 to a Law Enforcement Agency via an LEMF 120. Optionally, the routing circuitry 190 may also be configured to receive instructions whether to rout a communication session over HI3 or HI4 based on the quality marking and traffic class from the decision making circuitry block 180.

The routing circuitry 190 comprises a HI3 mediator 193 for mediating the CC over the HI3 interface and a HI4 mediator 194 for mediating the CC over the HI4 interface.

According to some embodiments, low quality marked communication sessions of the first routing group may be routed to a quality enhancer 184 configured to reduce jitter in each low quality marked communication session, thereby raising the quality. Only LQoE multimedia packets, i.e. LQoE in the first routing group, enter the Quality Enhancer block 184 to be properly treated to achieve the QoS requirement specified in [4]. This block uses a de-jitter buffer to reduce the jitter. IP packets that are out of sequence are held by the jitter buffer briefly, reordered if necessary, and delivered to the LEA.

The de-jitter buffer works on the packet arrivals by turning variable network delays into constant delays.

The arrangement 160 comprises a traffic shaping device 186 configured for traffic shaping communication sessions of the first routing group to control congestion in the regular handover interface HI3. In order to maintain network performance during peak traffic times and ease network congestion, a traffic shaping technique is applied to smooth traffic peaks over HI3 interface. Traffic shaping is a technique of congestion control and has been used in this proposal to guarantee that all packets are delivered to the LEA by adjusting the DF3 transmission speed. This technique may introduce a fixed IP packets delay due to buffering, but respect to the prior art, the LEA's operator may experience only brief moments of silence instead of completely understandable interception.

As a result, the CC outgoing from DF3 is de-jittered, e.g. delay variation is reduced or removed) and the traffic shaping technique is applied only when network congestion occurs. It aims to reduce the risk to reintroduce a packet delay variation because of network congestion over HI3.

Optionally, a correlation number is generated and the session flows of the same communication session are marked in the header of the LI data packet headers with the correlation number. This feature is especially convenient for correlating said routing groups session flows at the LEA, if the same communication session is sorted in different routing groups. Thus, the decision making block 180 may optionally comprise a correlation number marker 188, which is configured to generate and mark session flows with a correlation number, which is used for correlating said routing groups session flows at the LEA. Further, the correlation number marker 188 may optionally be configured to notify the LEA about change of routing group for the communication session and the correlation number that the session flows are marked with. The LEA is therefore configured to receive the notification and to read correlation marking in the data packets of the incoming communication session's CC, and to correlate and link the CC received via different routing groups, i.e. via HI3 and HI4 interfaces.

Figure 4:
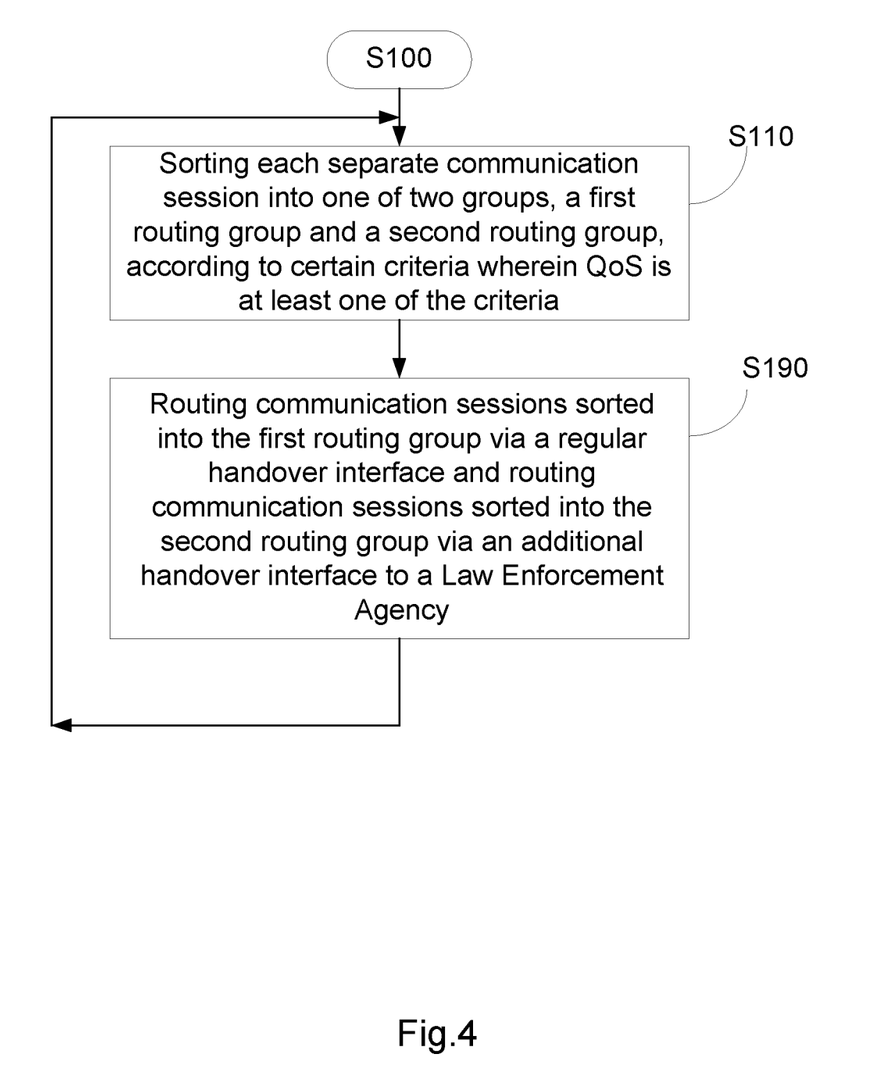
FIG. 4 is a flowchart illustrating further one embodiment of a method for QoS-aware routing.

FIG. 4 is a flowchart illustrating one embodiment of a method for QoS-aware routing of received session flows of separate communication sessions.

According to a second aspect, a method for QoS-aware routing of received session flows of separate communication sessions are provided. Said sessions comprise Communication Content achieved and received from Lawful Interception of target sessions as described above. The method comprises:

S110:—Sorting each separate communication session into one of two groups, a first routing group and a second routing group, according to certain criteria wherein QoS is at least one of the criteria. The arrangement 160 comprises a sorting device 170 configured to sort each separate communication session into one of two groups: a first routing group and a second routing group. The grouping based on to certain criteria wherein QoS is at least one of the criteria.

S190:—Routing communication sessions sorted into the first routing group via a regular handover interface HI3 and routing communication sessions sorted into the second routing group via an additional handover interface HI4 to a Law Enforcement Agency. The arrangement further comprises a routing circuitry 190 configured to route communication sessions sorted into the first routing group via a regular handover interface HI3 and route communication sessions sorted into the second routing group via an additional handover interface HI4 to a Law Enforcement Agency via an LEMF 120.

Figure 5:
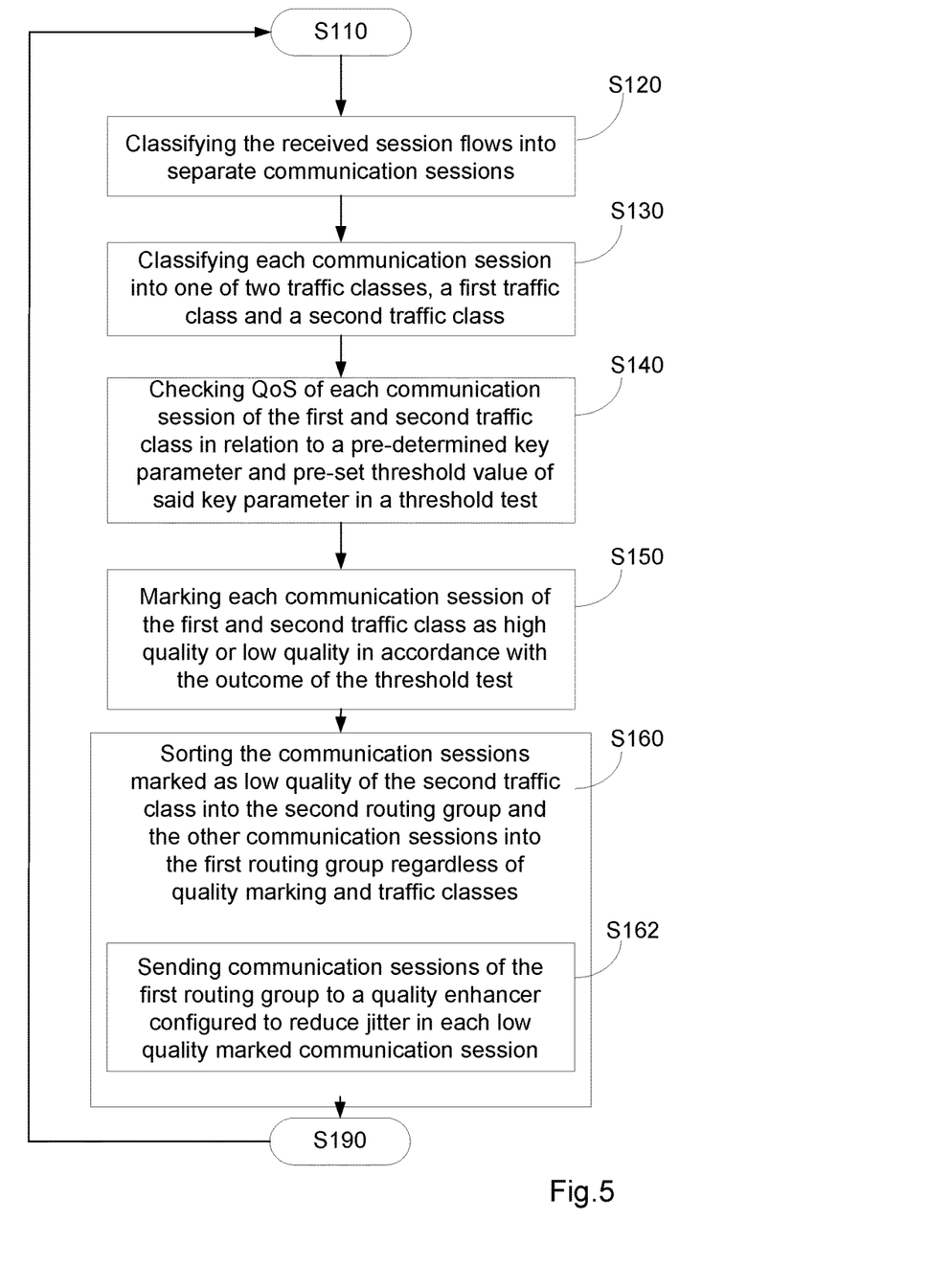
FIG. 5 is a flowchart illustrating further one embodiment of a method for QoS-aware routing.

FIG. 5 is a flowchart illustrating further one embodiment of a method for QoS-aware routing of received session flows of separate communication sessions.

According to said embodiment of the method, the sorting S110 of each separate communication session involves:

S120:—Classifying the received session flows into separate communication sessions. The first classifier 172 (see FIG. 3) is configured to classify the received session flows into separate communication sessions.

When the level 1 classification has been performed by the first classifier 172 and the incoming streams of packets are classified into distinct communication sessions, the level 2 classification is performed by the second classifier 174 and communication sessions are determined and classified into different traffic classes, which enables differentiated traffic handling. The level 2 classification implies:

S130:—Classifying each communication session into one of two traffic classes, a first traffic class and a second traffic class. The second classifier 174 (see FIG. 3) is configured to classify each communication session into one of two traffic classes, a first traffic class and a second traffic class. According to some embodiments, the first traffic class may comprise communication sessions belonging to multimedia services and the second traffic class may comprise communication sessions of other services than multimedia services, e.g. data transfer services.

The sorting of each separate communication session also involves:

S140:—Checking QoS of each communication session of the first or second traffic class in relation to a pre-determined key parameter and a pre-set threshold value of said key parameter in a threshold test. The sorting device 170 further comprises a quality checking circuitry 176 configured to check QoS of each communication session in relation to a pre-determined key parameter and a pre-set threshold value of said key parameter in a threshold test.

The Quality Checker block 176 is responsible for checking the quality level of the stream of packets through key parameters, e.g. routing metrics. A routing metric is a quality requirement used by the routing algorithm to determine the best route to be chosen. The predetermined key parameters when checking of QoS is information loss for communication sessions of the first traffic class and delay variation for communication sessions of the second traffic class. A threshold mechanism is proposed for verifying the compliance of service streams to the above listed routing metrics. IP packets belonging to the services that exceed these thresholds and so that affect the LEA's QoE are marked as LQoE, Low Quality of Experience, and others are marked as HQoE, High Quality of Experience. The sorting device 170 is therefore provided with marking circuitry 178 configured to mark each communication session as high quality or low quality in accordance with the outcome of the threshold test:

S150:—Marking each communication session of the first and second traffic class as high quality or low quality in accordance with the outcome of the threshold test. At the egress of the marking circuitry 178, the packets marked as LQoE or HQoE are treated in a different way by means of a decision making circuitry 180. The sorting of each separate communication session involves:

S160:—Sorting the communication sessions marked as low quality of the second traffic class into the second routing group and the other communication sessions into the first routing group regardless of quality marking and traffic classes. The decision making circuitry 180 in the sorting device 170 is configured to sort each separate communication session into one of two groups: a first routing group and a second routing group. The grouping is based on certain criteria wherein QoS is at least one of the criteria. Thus, the decision making circuitry 180 is configured to sort the communication sessions according to their marking.

The decision making block 170 handles communication sessions being marked as HQoE or LQoE, decides and sorts each separate communication session into one of two groups, and instructs a routing circuitry 190 to route it over HI3 or HI4, respectively. The decision making circuitry 180 is configured to send low quality marked communication sessions of the first routing group to a quality enhancer 184 configured to reduce jitter in each low quality marked communication session:

S162:—Sending communication sessions of the first routing group to a quality enhancer configured to reduce jitter in each low quality marked communication session.

Figure 6:
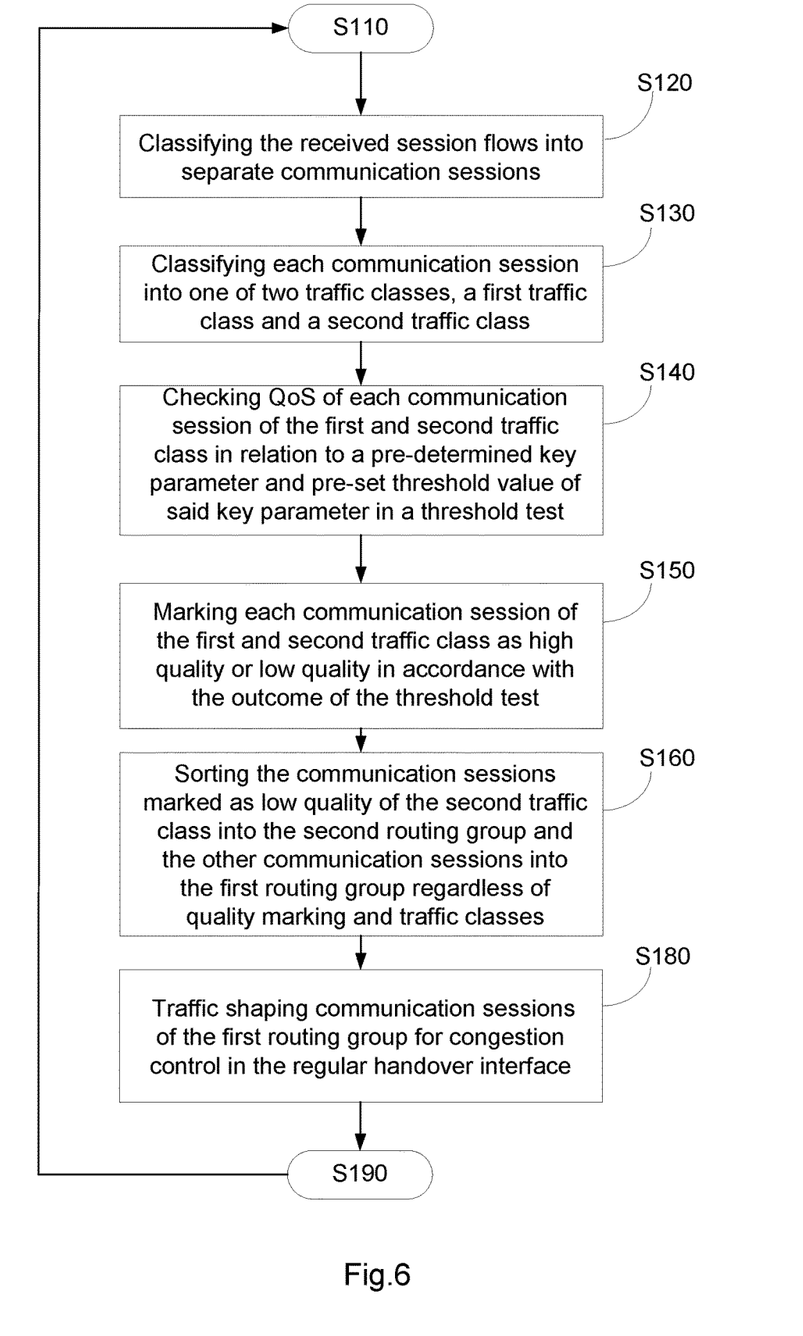
FIG. 6 is a flowchart illustrating further one embodiment of a method for QoS-aware routing.

As illustrated in the flowchart of FIG. 6, an alternative flow may be performed by:

S180:—Sending communication sessions of the first routing group for traffic shaping for congestion control in the regular handover interface HI3. The arrangement comprises a traffic shaping device 186, which is configured for traffic shaping communication sessions of the first routing group to control congestion in the regular handover interface HI3.

Now the routing over one of the interfaces is started:

S190:—Routing communication sessions sorted into the first routing group via a regular handover interface HI3 and routing communication sessions sorted into the second routing group via an additional handover interface HI4 to a Law Enforcement Agency. The arrangement further comprises a routing circuitry 190 configured to route communication sessions sorted into the first routing group via a regular handover interface HI3 and route communication sessions sorted into the second routing group via an additional handover interface HI4 to a Law Enforcement Agency via an LEMF 120.

Figure 7:
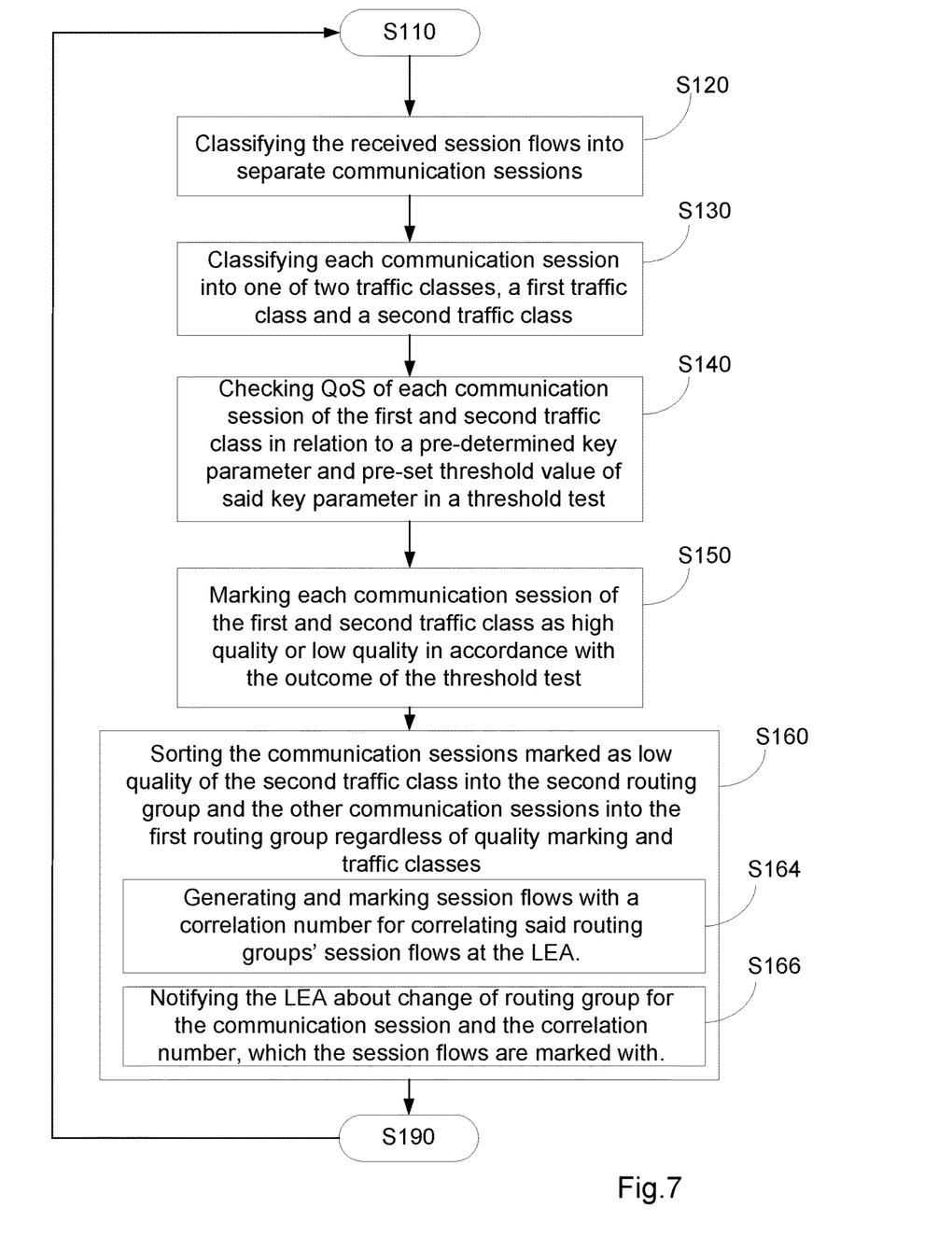
FIG. 7 is a flowchart illustrating further one embodiment of a method for QoS-aware routing.

FIG. 7 is a flowchart illustrating further one embodiment of a method for QoS-aware routing. Optionally, if the same communication session is sorted in different routing groups, a correlation number is convenient for correlating said routing groups session flows at the LEA. Thus, the decision making block 180 may optionally comprise a correlation number marker 188, which is configured to generate and mark session flows with a correlation number, which is used for correlating said routing groups session flows at the LEA:

S164:—Generating and marking session flows with a correlation number for correlating said routing groups session flows at the LEA. This is especially convenient. Further, the correlation number marker 188 may optionally be configured to notify the LEA about change of routing group for the communication session and the correlation number that the session flows are marked with.

S166:—Notifying the LEA about change of routing group for the communication session and the correlation number, which the session flows are marked with. The LEA is therefore configured to receive the notification and to read correlation marking in the data packets of the incoming communication session's CC, and to correlate and link the CC received via different routing groups, i.e. via HI3 and HI4 interfaces.

When the sorting S110 is finished, the communication sessions are routed:

As discussed above, low quality marked communication sessions of the first routing group are routed to a quality enhancer 184, which is configured to reduce jitter in each low quality marked communication session of the first routing group, thereby raising the quality. Only LQoE multimedia packets, i.e. LQoE in the first routing group, enter the Quality Enhancer block 184 to be properly treated to achieve the QoS requirement specified in [4]. This block uses a de-jitter buffer to reduce the jitter. IP packets that are out of sequence are held by the jitter buffer briefly, reordered if necessary, and delivered to the LEA. This embodiment is illustrated in the flowchart in FIG. 8.

Figure 8:
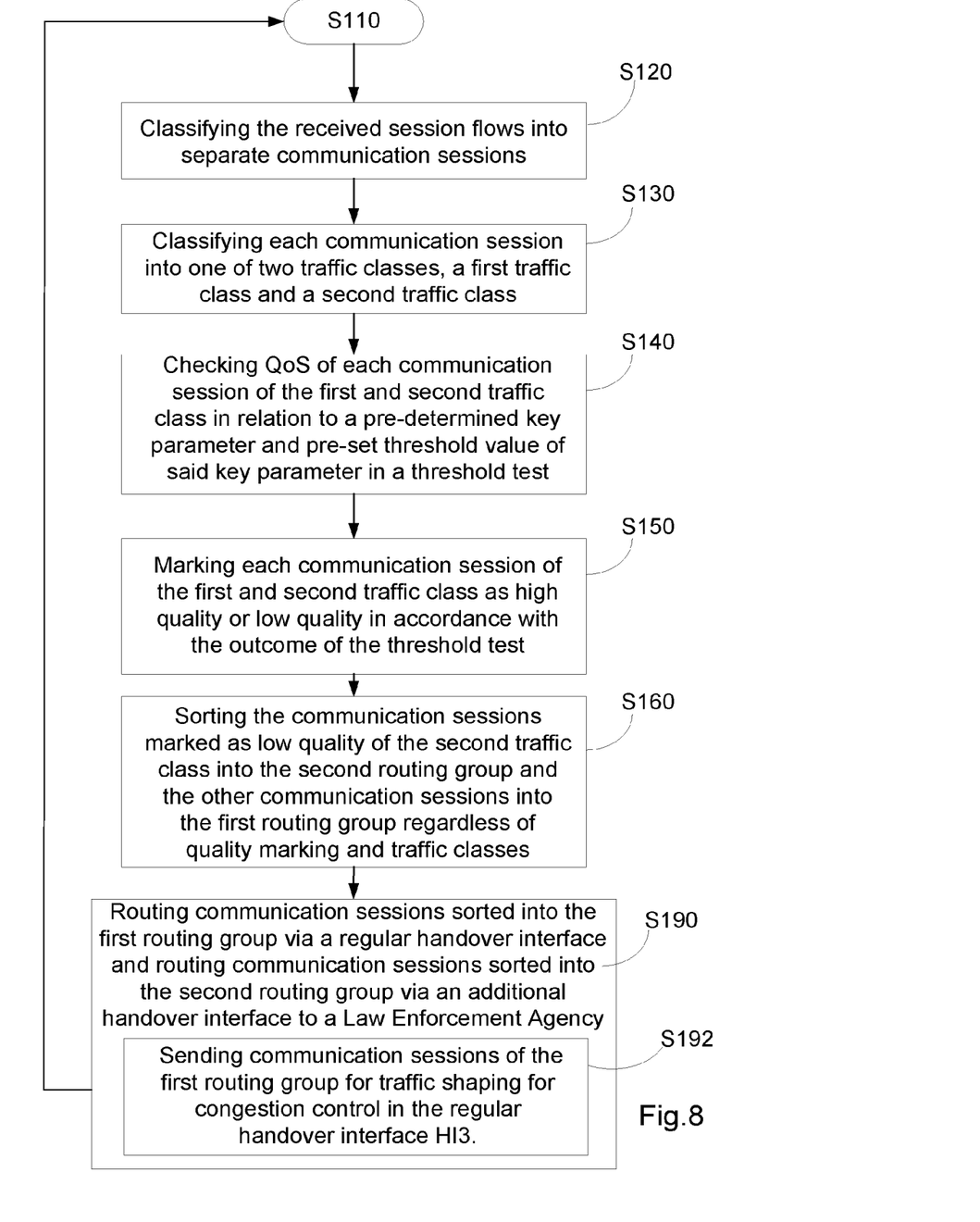
FIG. 8 is a flowchart illustrating further one embodiment of a method for QoS-aware routing.

The routing of communication sessions, S190, may therefore involve:

S192:—Sending communication sessions of the first routing group for traffic shaping for congestion control in the regular handover interface HI3.

Figure 9:
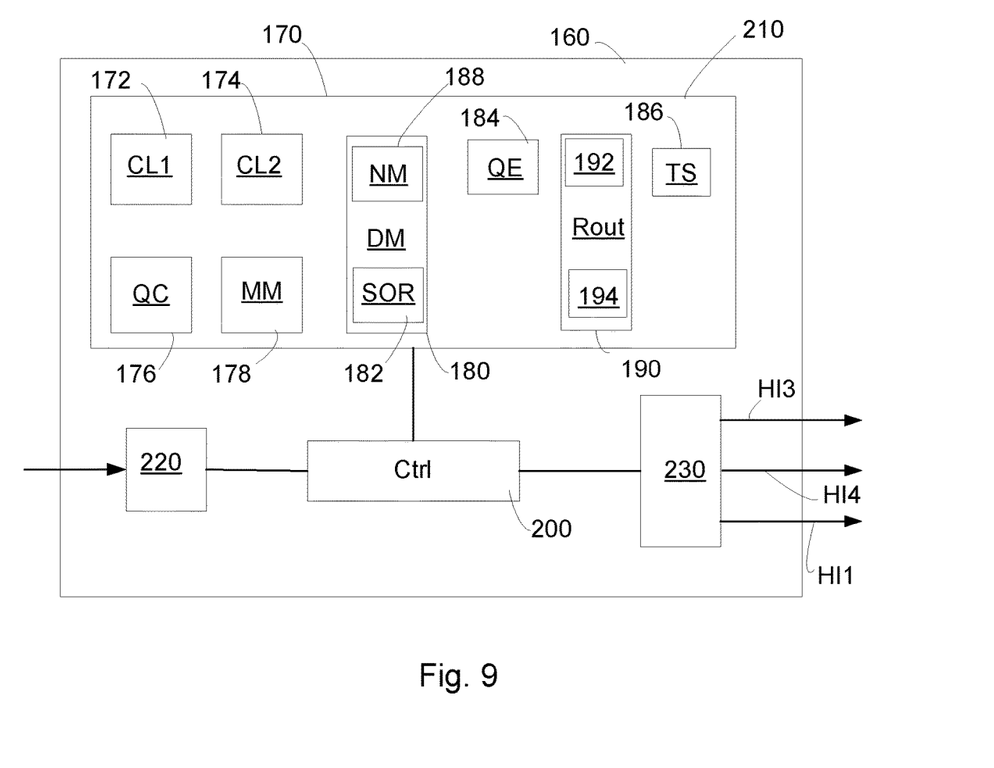
FIG. 9 is a block diagram showing further one embodiment of the arrangement, i.e. a CC MF, in more detail.

FIG. 9 is illustrating an alternative embodiment of the arrangement 160.

This embodiment is an arrangement for QoS-aware routing of received session flows of separate communication sessions comprising Communication Content achieved and received from Lawful Interception of target sessions. The arrangement 160 comprises a processor 200, an in interface 220 for receiving communication sessions comprising Communication Content, an output interface for sending communication sessions comprising Communication Content, and a memory 210. The memory 210 contains instructions executable by said processor 200 whereby said arrangement is operative to perform:

S110:—Sorting each separate communication session into one of two groups, a first routing group and a second routing group, according to certain criteria wherein QoS is at least one of the criteria; and S190:—Routing communication sessions sorted into the first routing group via a regular handover interface HI3 and routing communication sessions sorted into the second routing group via an additional handover interface HI4 to a Law Enforcement Agency. In FIG. 9, instructions for performing S110 are indicated as a module 170 and the instructions for performing S190 are indicated in module 190.

The memory 210 of the arrangement may further comprise a first module 172 comprising instructions to classify the received session flows into separate communication sessions, and a second module 174 comprising instructions to classify each communication session into one of two traffic classes, a first traffic class and a second traffic class. The first traffic class may comprise communication sessions belonging to multimedia services and the second traffic class may comprise communication sessions of other data transfer services than multimedia services.

The memory 210 of the arrangement may further a module 176 comprising instructions to check QoS of each communication session in relation to a pre-determined key parameter and a pre-set threshold value of said key parameter in a threshold test, and a module 178 comprising instructions to mark each communication session as high quality or low quality in accordance with the outcome of the threshold test.

The predetermined key parameters when checking of QoS may be information loss for communication sessions of the first traffic class and delay variation for communication sessions of the second traffic class.

The arrangement may further comprise a module 180 comprising instructions to sort the communication sessions marked as low quality of the second traffic class into the second routing group and the other communication sessions into the first routing group regardless of quality marking and traffic classes.

The module 180 may further comprise instructions to send communication sessions of the first routing group to a quality enhancer module 184 comprising instructions to reduce jitter in each low quality marked communication session.

The memory 210 of the arrangement may further comprise a traffic shaping module 186 comprising instructions for traffic shaping communication sessions of the first routing group to control congestion in the regular handover interface HI3.

The memory 210 may further comprise a correlation number marker module 188 comprising instructions to generate and mark session flows of the same communication session being sorted in different routing groups with a correlation number for correlating said routing groups session flows at the LEA, said correlation number marker module is further configured to notify the LEA about change of routing group for the communication session and the correlation number, which the session flows are marked with.

The above described method, arrangement and embodiments thereof may be implemented in digital electronically circuitry, or in computer hardware, firmware, software, or in combinations of them. The arrangement may be implemented in a computer program product tangibly embodied in a machine readable storage device for execution by a programmable processor; and method steps may be performed by a programmable processor executing a program of instructions to perform functions of the invention by operating on input data and generating output.

The arrangement and method may advantageously be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language.

Generally, a processor will receive instructions and data from a read-only memory and/or a random access memory. Storage devices suitable for tangibly embodying computer program instructions and data include all forms of non-volatile memory, including by way of example semiconductor memory devices, such as EPROM, EEPROM, and flash memory devices; magnetic disks such internal hard disks and removable disks; magneto-optical disks; and CD-ROM disks. Any of the foregoing may be supplemented by, or incorporated in, specially designed ASICs (Application Specific Integrated Circuits).

A number of advantages are achieved, such as:
Low cost of implementation due the existing technology like DPI.
Solution which makes a smart usage of the available bandwidth allows operators to respond the LEA needs in their country by saving investments in bandwidth and transport expenses.
LEA is provided with all content of communication without the need of filtering low quality CC
By receiving low quality CC on a dedicated HI interface, LEA is enabled to increase:
Efficiency;
User experience
No prior decision is to be taken when setting a warrant since the LI system dynamically routes the intercepted CC according to quality metrics.
This idea provides a mechanism to enhance the quality of the multimedia services received by the LEA.
A number of embodiments have been described. It will be understood that various modifications may be made without departing from the scope of the invention.

REFERENCES

[1] 3GPP TS 33.106 "Lawful Interception requirements (Release 8)";
[2] 3GPP TS 33.107 "Lawful interception architecture and functions (Release 8)";
[3] 3GPP TS 33.108 "Handover interface for Lawful Interception" (Release 8);
[4] ITU-T Recommendation G.1010 (November 2001), End-user multimedia QoS categories
[5] ETSI ES 201 671 V3.1.1 (2006 October), Lawful Interception (LI); Handover interface for the lawful interception of telecommunications traffic http://www.etsi.org/deliver/etsi_es/201600_201699/201671/03.01.01_50/es_201671v030101m.pdf

The invention claimed is:

1. A method for Quality of Service (QoS)-aware routing of received session flows of separate communication sessions comprising Communication Content received from Lawful Interception of target sessions, the method comprising:
sorting each said separate communication session into one of two routing groups, a first routing group and a second routing group, according to certain criteria, wherein QoS is at least one of the criteria, and sorting each said separate communication session includes:
classifying each said separate communication session into one of two traffic classes, a first traffic class and a second traffic class;
marking each communication session of the first and second traffic class with a quality marking indicating high quality or low quality in accordance with an outcome of a QoS threshold test; and
sorting the communication sessions marked as low quality of the second traffic class into the second routing group, and sorting all other communication sessions into the first routing group regardless of the quality marking and the traffic class;
routing communication sessions sorted into the first routing group via a regular handover interface to a Law Enforcement Agency; and
routing communication sessions sorted into the second routing group via a second handover interface to the Law Enforcement Agency.

2. The method according to claim 1, wherein the first traffic class comprises communication sessions belonging to multimedia services, and the second traffic class comprises communication sessions of data transfer services other than multimedia services.

3. The method according to claim 1, wherein the QoS threshold test comprises:
checking QoS of each said separate communication session of the first or second traffic class in relation to a pre-determined key parameter and a pre-set threshold value of said key parameter in a threshold test.

4. The method according to claim 3, wherein the predetermined key parameters, when checking QoS, comprise information loss for communication sessions of the first traffic class and delay variation for communication sessions of the second traffic class.

5. The method according to claim 1, further comprising, prior to routing communication sessions sorted into the first routing group via the regular handover interface to the Law Enforcement Agency, sending communication sessions of the first routing group to a quality enhancer configured to reduce jitter in each low quality marked communication session.

6. The method according to claim 1, further comprising, prior to routing communication sessions sorted into the first routing group via the regular handover interface to the Law Enforcement Agency, sending communication sessions of the first routing group for traffic shaping for congestion control in the regular handover interface.

7. The method according to claim 1, further comprising:
generating and marking session flows of a same communication session being sorted in different routing groups with a correlation number for correlating said routing groups' session flows at the LEA; and
notifying the LEA about a change of routing group for the same communication session and the correlation number, with which the session flows are marked.

8. An arrangement for Quality of Service (QoS)-aware routing of received session flows of separate communication sessions comprising Communication Content received from Lawful Interception of target sessions, the arrangement comprising:
a sorting circuitry configured to sort each said separate communication session into one of two routing groups, a first routing group and a second routing group, according to certain criteria wherein QoS is at least one of the criteria, and the sorting circuitry is configured to:
classify each said separate communication session into one of two traffic classes, a first traffic class and a second traffic class;
mark each communication session of the first and second traffic class with a quality marking indicating high quality or low quality in accordance with an outcome of a QoS threshold test; and
sort the communication sessions marked as low quality of the second traffic class into the second routing group, and sort all other communication sessions into the first routing group regardless of the quality marking and the traffic class;
a routing circuitry configured to:
route communication sessions sorted into the first routing group via a regular handover interface to a Law Enforcement Agency; and
route communication sessions sorted into the second routing group via a second handover interface to the Law Enforcement Agency.

9. The arrangement according to claim 8, wherein the first traffic class comprises communication sessions belonging to multimedia services, and the second traffic class comprises communication sessions of data transfer services other than multimedia services.

10. The method according to claim 8, wherein the QoS threshold test comprises:
checking QoS of each said separate communication session of the first or second traffic class in relation to a pre-determined key parameter and a pre-set threshold value of said key parameter in a threshold test.

11. The arrangement according to claim 10, wherein the predetermined key parameters, when checking QoS, comprise information loss for communication sessions of the first traffic class and delay variation for communication sessions of the second traffic class.

12. The arrangement according to claim 8, wherein the sorting circuitry includes, decision making circuitry configured to send communication sessions of the first routing group to a quality enhancer circuitry configured to reduce jitter in each low quality marked communication session.

13. The arrangement according to claim 8, wherein the arrangement comprises a traffic shaping circuitry configured to traffic shape communication sessions of the first routing group to control congestion in the regular handover interface.

14. The arrangement according to claim 8, wherein the arrangement further comprises a correlation number marker circuitry configured to:
generate and mark session flows of a same communication session being sorted in different routing groups with a correlation number for correlating said routing groups session flows at the LEA; and
notify the LEA abobt a change of routing group for the same communication session and the correlation number, with which the session flows are marked.

15. An arrangement for Quality of Service (QoS)-aware routing of received session flows of separate communication sessions comprising Communication Content received from Lawful Interception of target sessions, the arrangement comprising a processor and a memory, said memory containing instructions executable by said processor whereby said arrangement is operative to:
sort each said separate communication session into one of two routing groups, a first routing group and a second routing group, according to certain criteria wherein QoS is at least one of the criteria, and sorting each said separate communication session includes:
classifying each said separate communication session into one of two traffic classes, a first traffic class and a second traffic class;
marking each communication session of the first and second traffic class with a Quality marking indicating high quality or low quality in accordance with an outcome of a QoS threshold test; and
sorting the communication sessions marked as low quality of the second traffic class into the second routing group, and sorting all other communication sessions into the first routing group regardless of the quality marking and the traffic class;
route communication sessions sorted into the first routing group via a regular handover interface to a Law Enforcement Agency; and
route communication sessions sorted into the second routing group via a second handover interface to the Law Enforcement Agency.

16. The arrangement according to claim 15, wherein the first traffic class comprises communication sessions belonging to multimedia services, and the second traffic class comprises communication sessions of data transfer services other than multimedia services.

17. The arrangement according to claim 15, wherein the arrangement is further operative to:
check QoS of each said separate communication session of the first or second traffic class in relation to a pre-determined key parameter and a pre-set threshold value of said key parameter in a threshold test.

18. The arrangement according to claim 17, wherein the predetermined key parameters, when checking QoS, comprise information loss for communication sessions of the first traffic class and delay variation for communication sessions of the second traffic class.

19. The arrangement according to claim 15, wherein the arrangement is further operative to:
send communication sessions of the first routing group to a quality enhancer circuitry configured to reduce jitter in each low quality marked communication session.

20. The arrangement according to claim 15, wherein the arrangement is further operative to:
send communication sessions of the first routing group for traffic shaping for congestion control in the regular handover interface.

21. The arrangement according to claim 15, wherein the arrangement is further operative to:
generate and mark session flows of a same communication session being sorted in different routing groups with a correlation number for correlating said routing groups' session flows at the LEA; and
notify the LEA about a change of routing group for the same communication session and the correlation number, with which the session flows are marked.

* * * * *